(12) United States Patent
Lamanna et al.

(10) Patent No.: US 6,545,109 B2
(45) Date of Patent: Apr. 8, 2003

(54) IMIDE SALTS AS EMULSIFIERS FOR THE POLYMERIZATION OF FLUOROOLEFINS

(75) Inventors: William M. Lamanna, Stillwater, MN (US); Patricia M. Savu, Maplewood, MN (US); Michael J. Sierakowski, Stillwater, MN (US); Lian S. Tan, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/896,319

(22) Filed: Jun. 29, 2001

(65) Prior Publication Data

US 2003/0018149 A1 Jan. 23, 2003

(51) Int. Cl.[7] .............................. C08F 2/24; C08F 14/18; C08F 14/26; C08F 14/28; C08F 14/20
(52) U.S. Cl. ...................... 526/220; 526/217; 526/222; 526/247; 526/250; 526/254
(58) Field of Search ................................. 526/220, 217, 526/222, 250, 254, 247

(56) References Cited

U.S. PATENT DOCUMENTS

| | | | |
|---|---|---|---|
| 2,701,814 A | 2/1955 | Smith | |
| 4,338,237 A | 7/1982 | Sulzbach et al. | 524/777 |
| 4,505,997 A | 3/1985 | Armand et al. | 429/192 |
| 4,529,781 A | 7/1985 | Cavanaugh | 526/214 |
| 4,555,556 A | 11/1985 | Beresniewicz | 526/212 |
| 4,558,142 A | 12/1985 | Holland et al. | 549/465 |
| 5,021,308 A | 6/1991 | Armand et al. | 429/194 |
| 5,072,040 A | 12/1991 | Armand | 564/82 |
| 5,256,821 A | 10/1993 | Armand | 564/82 |
| 5,285,002 A | 2/1994 | Grootaert | 526/222 |
| 5,318,674 A | 6/1994 | Behr et al. | 204/59 F |
| 5,688,884 A | 11/1997 | Baker et al. | 526/225 |
| 5,723,664 A | 3/1998 | Sakaguchi et al. | 564/82 |
| 5,874,616 A | 2/1999 | Howells et al. | 564/82 |
| 6,008,265 A | 12/1999 | Vallée et al. | 522/25 |
| 6,120,696 A | 9/2000 | Armand et al. | 252/62.2 |
| 6,171,522 B1 | 1/2001 | Michot et al. | 252/500 |
| 6,228,942 B1 | 5/2001 | Michot et al. | 525/183 |
| 6,280,883 B1 * | 8/2001 | Lamanna | 429/307 |

FOREIGN PATENT DOCUMENTS

| | | |
|---|---|---|
| WO | WO 98/08879 | 3/1998 |
| WO | WO 98/19988 | 5/1998 |
| ZA | 984155 | 5/1998 |

OTHER PUBLICATIONS

Book Page: *Preparation, Properties, and Industrial Applications of Organofluorine Compounds*, edited by R. E. Banks, Ellis Horwood Ltd. (1982), p. 25.
Article: Domnin et al., "Calculation of the Enthalpies of Formation of Substituted Cyclopropenes*," *Russian Journal of Organic Chemistry*, vol. 35, No. 1, 1999, pp. 28–33.
Article: de Pasquale, "Fluorinated Isocyanates—Reactions with Flourinated Anhydrides, Acids, and Related Substrates," *J. Fluroine Chem.*, 8, 1976, pp. 311–322.
Article: Hendricks, "Industrial Fluorochemicals," *Ind. Eng. Chem.*, vol. 45, No. 1, Jan., 1953, pp. 99–105.
Article: Young et al., "Fluorocarbon Nitrogen Compounds. VII.[1] The Indirect Fluorination of Some Fluorocarbon Nitrogen Derivatives[2]," *J. Amer. Chem. Soc.*, vol. 82, Sep. 5, 1960, pp. 4553–4556.
Book Excerpt: *Amphoteric Surfactants*, edited by Eric G. Lomax, Marcel Dekker Inc., (1996), pp. 13–17.
Book Excerpt: *Organofluorine Chemicals and Their Industrial Applications*, edited by R. E. Banks, Ellis Horwood Ltd. (1979), pp. 53–57.
Article: Ye et al., "Preparation of Fluorinated Imides," *J. Fluorine Chem.*, 81 (2), 1997, pp. 193–196.
Article: Bernett et al., "Wetting of Low–Energy Solids by Aqueous Solutions of Highly Fluorinated Acids and Salts[1]," *J. Phys. Chem.*, vol. 63, Nov., 1959, pp. 1911–1916.
Article: Mazalov et al., "Methods of Preparation and Properties of Organofluorine Compounds IV. 5,5,5–Trichloro–N–(1,1–Dichloronona–Fluoropentyl)Hexafluorovalerimidoyl Chloride," *J. Gen. Chem.*, USSR (Eng. Transl.), vol. 36, No. 7, Jul., 1966, pp. 1344–1350.
Article: Yagupol'skii et al., "Trifluoromethylsulfonylimino Derivatives of Sulfur Dioxide and its Halogen–and Selenium–Containing Analogs*," *Russ. J. Org. Chem.*, vol. 35, No. 1, 1999, pp. 22–25.

* cited by examiner

*Primary Examiner*—Fred Zitomer
(74) *Attorney, Agent, or Firm*—Lisa M. Fagan

(57) ABSTRACT

The present invention provides imide salts as emulsifiers for the polymerization of fluoroolefins.

19 Claims, 1 Drawing Sheet

IMIDE SALTS AS EMULSIFIERS FOR THE POLYMERIZATION OF FLUOROOLEFINS

FIELD OF INVENTION

This invention relates to a process for manufacturing fluoropolymers. More particularly, the present invention relates to using imide salts as emulsifiers for polymerizing fluoroolefins.

BACKGROUND OF INVENTION

Fluorine-containing polymers, or fluoropolymers, are used in many commercial products. Fluoropolymers are known to exhibit chemical inertness (i.e., resistance to chemical attack), high thermal stability, usefulness at high temperatures, and toughness and flexibility at low temperatures.

Useful fluoropolymers include both fluoroelastomers and fluoroplastics. Fluoropolymers can contain interpolymerized units derived from olefinically unsaturated monomers, such as monomers of vinylidene fluoride, hexafluoropropylene, tetrafluoroethylene, etc. Fluoroelastomers (e.g., FLUOREL™ (available from Dyneon, LLC, St. Paul, Minn.) and VITON™ (available from E. I. DuPont de Nemours & Company, Wilmington, Del.)) have particular utility in high temperature applications, such as seal gaskets and linings. Fluoroplastics (e.g., THV™ 200, THV™ 400, THV™ 500G, THV™ 610X available from Dyneon LLC), particularly those containing interpolymerized monomeric units derived from chlorotrifluoroethylene, tetrafluoroethylene, hexafluoropropylene, and vinylidene fluoride, have numerous electrical, mechanical, and chemical applications. As an example, these fluoroplastics are useful in wire, electrical components, seals, solid and lined pipes, and pyroelectric detectors. Examples of fluoropolymers include, but are not limited to, poly(tetrafluoroethylene) (PTFE), perfluoroalkoxyalkane (PFA), perfluoro(ethylene-propene) copolymer (FEP), ethylene-perfluoroethylenepropene copolymer (EFEP), tetrafluoroethylene-perfluoro(dioxole) copolymer (TFE/PDD), vinylidene fluoride-tetrafluoroethylene copolymer (VDF/TFE), polyvinylidene fluoride (PVDF), polyvinylfluoride (PVF), polychlorotrifluoroethylene (PCTFE), and ethylene-chlorotrifluoroethylene copolymer (ECTFE).

One method of obtaining fluoropolymers is by emulsion polymerization of the fluorinated monomers in aqueous media. In emulsion polymerization, the emulsifier is normally used at a high enough concentration such that micelles, which serve as the loci for polymerization, are present in the aqueous phase. The emulsifier also provides colloidal stability to the formed polymeric particles through electrostatic repulsion and/or steric stabilization to prevent particle agglomeration and coagulation.

Perfluorinated surfactants have been used as emulsifiers in the emulsion polymerization of fluoroolefins to minimize chain transfer. They allow the polymerizations to be conducted in aqueous media, and also improve the physical properties of the fluoropolymer and increase the rate of polymerization. A perfluorooctanoyl fluoride (PFOF) derived emulsifier, ammonium perfluorooctanoate, has been the preferred emulsifier for commercial production of fluoropolymers. It has been reported that certain perfluorooctyl-containing compounds may tend to have low bioelimination rates in living organisms as well as persistence in the environment. This tendency has been cited as a potential concern for some fluorochemical compounds. See, for example, U.S. Pat. No. 5,688,884 (Baker et al.). Introduction of an emulsifier and its degradation products into the environment may occur either from streams related to the use of the emulsifier itself or to waste streams/emissions from its manufacture.

As a result, there is a desire for fluorine-containing compositions that are effective in providing desired emulsifier properties, that eliminate more rapidly from the body, that degrade in the environment to non-bioaccumulative degradation products, and that is not prone to accumulation in living organisms. The precursor to these emulsifiers should preferably be less bioaccumulative than PFOF derived materials to prevent the possible introduction of bioaccumulative and persistent materials into the environment from manufacturing streams. In addition, the emulsifiers preferably can be manufactured in a cost-effective manner.

SUMMARY OF THE INVENTION

The present invention provides imide salts useful as emulsifiers for the polymerization of fluoroolefins. Advantageously, the emulsifiers of the present invention are comprised of imide anions that have good surface activity while being physically and chemically stable during their use as emulsifiers. The emulsifiers of the present invention are expected to gradually degrade in the environment and will likely more rapidly bioeliminate than ammonium perfluorooctanoate. In addition, the emulsifiers of the present invention can be produced from lower cost intermediates, such as $C_4F_9COF$ and $C_4F_9SO_2F$, compared with emulsifiers derived from $C_7F_{15}COF$ (PFOF), which is produced in relatively low yields by electrochemical fluorination (ECF).

The present invention comprises a method of using imide salts as emulsifiers to emulsion polymerize fluoroolefins.

The present invention comprises a method for preparing fluoropolymers comprising emulsion polymerizing in an aqueous phase, under free-radical conditions, at least one fluoromonomer in the presence of at least one emulsifier and at least one initiator, wherein said emulsifier comprises at least one anion of the following formula:

where each Q is independently CO or $SO_2$ and each $R_f$ is independently a perfluorinated alkyl group; and a non-interfering cation.

Another embodiment of the present invention is a method wherein the aqueous phase further comprises one or more chain transfer agents.

Yet another embodiment of the present invention is a method wherein the aqueous phase further comprises at least one non-fluorinated monomer.

Figure 1:
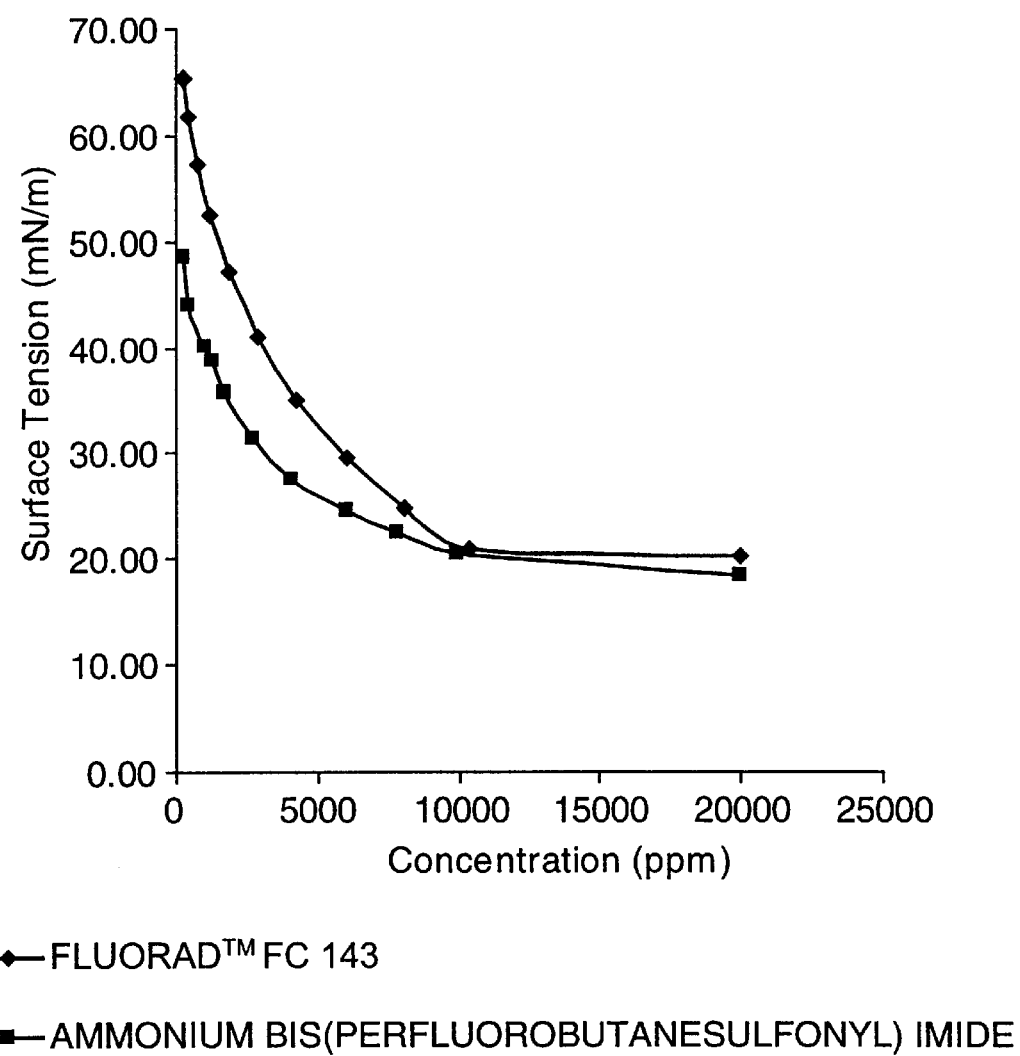
FIG. 1 is a graph of the surface tension (dynes/cm) versus concentration (ppm) of ammonium perfluorooctanoate (FLUORAD™ FC-143) and ammonium bis(perfluorobutanesulfonyl)imide.

This FIGURE is intended to be merely illustrative and nonlimiting.

DETAILED DESCRIPTION OF ILLUSTRATIVE EMBODIMENTS

The present invention provides a process for manufacturing fluoropolymers by emulsion polymerization in aqueous media. Emulsion polymerization is defined herein as polymerization in the aqueous phase to yield a latex, which is fine particles dispersed in water. Typically, a particle size less than one micron is preferable. Emulsifiers preferably have the following characteristics: do not retard the reaction or polymerization, give the desired particle size, do not act as a chain transfer agent, and be water soluble.

Advantageously, the present invention provides perfluorinated emulsifiers that have all of these characteristics and that give good fluoropolymer emulsion stability while offering an improved environmental profile by incorporating anion structures that are susceptible to cleavage in the environment and that have relatively short perfluoroalkyl chains that are expected to be less prone to bioaccumulation.

Emulsion polymerization typically involves free radical polymerization of monomers in an aqueous medium (i.e., an aqueous phase) in the presence of an emulsifier and a free radical initiator.

In the present invention, fluorinated monomers can be homopolymerized or optionally copolymerized with one or more fluoromonomers and/or one or more non-fluorinated monomers to produce fluoropolymers that are partially or completely fluorinated.

The aqueous phase typically comprises a water-soluble initiator, such as ammonium or alkali metal persulfates or alkali metal permanganates, which produce free radicals. See for example U.S. Pat. No. 5,285,002 (Grootaert). The initiator choice depends on the reactivity of the monomer(s) and the desired physical properties of the fluoropolymer, for example the desired molecular weight.

The aqueous phase may further comprise a chain transfer agent. Chain transfer agents react with the growing polymer chain to reduce molecular weight. Examples of conventional chain transfer agents include carbon tetrachloride, acetone, diethyl malonate, methanol, halogen-containing materials (e.g., potassium bromide), and dodecylmercaptan. The type and amount varies with the starting monomers and the desired end product. In fluoroolefin polymerizations, any proton containing organic material can act as a chain transfer agent due to the propensity of a fluorinated free radical to abstract a hydrogen radical (H·) from an organic species rather than to react with another fluorinated olefin or fluorinated free radical.

Other additives can include buffering agents and waxes (e.g., paraffin).

The emulsion polymerization of the present invention can be carried out under conventional steady-state conditions (continuous process), as a batch process, or as a semi-batch process.

For example, in a continuous process, the selected monomers, water, emulsifier, etc., are continuously fed to a stirred tank reactor under optimum pressure and temperature conditions and the resulting latex is continuously removed.

Alternatively, in a batch process, all of the components are fed into a reactor and allowed to react at a set temperature for a specified length of time. The latex is then removed and undergoes separation.

In a semi-batch process, the reactor may be charged with water and emulsifier (and other desired additives) and then the monomer (and initiator) may be fed into the reactor at a designated rate to maintain a constant pressure. When the polymerization is complete, the reactor is emptied and then the latex is separated using conventional techniques.

The emulsifier can then be recycled.

The pressure, temperature, and amounts of each component are determined based on the starting materials and the desired fluoropolymer.

Emulsifier Anion

The emulsifiers of the present invention include disulfonyl imide, dicarbonylimide, and mixed carbonyl sulfonyl imide anions. The imide anion can be represented by the following formula:

where Q is CO or $SO_2$, preferably, $SO_2$, and each $R_f$ is independently a perfluorinated alkyl group, optionally containing catenated (in-chain) heteroatoms (such as O, N), and wherein any two $R_f$ groups may be linked to form a ring. Preferably, each $R_f$ group has at least 2 carbons, more preferably from 3 to 6 carbons. Each perfluoroalkyl chain may be linear or branched, but preferably, $R_f$ is a straight chain.

Examples of suitable imide anions include, but are not limited to:

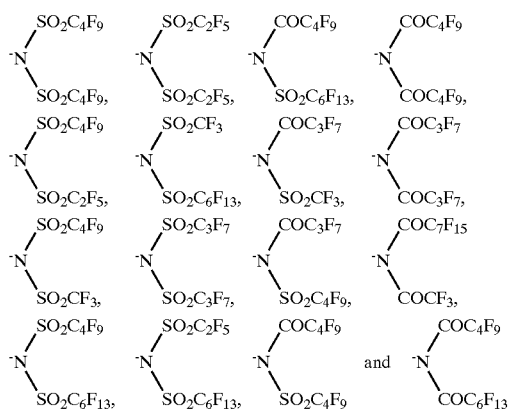

Bis(perfluorobutanesulfonyl)imide is a particularly useful emulsifier.

Bis(perfluoroalkanesulfonyl)imides and their salts may be prepared from perfluoroalkanesulfonyl halides by methods that are well known in the art and described in U.S. Pat. Nos. 5,874,616 and 5,723,664 and ZA 9804155. Generally, these anions can be prepared by reacting $2R_fSO_2X$ with $NH_3$ in the presence of $Et_3N$ (or a similar base) or by reacting $R_fSO_2X$ with $R_fSO_2NH_2$ in the presence of $Et_3N$ (or a similar base).

Perfluorinated mixed carbonyl sulfonyl imides may be prepared by the reaction of perfluoroalkanesulfonamide salts, such as $Na^+\text{-}NH(SO_2R_f)$ with trifluoroacetic anhydride and higher homologs, as described in Yu L. Yagupolskii et al.; *Russ. J. Org. Chem.*, 35, 1, 1999, pp. 22–25. Alternative methods of preparing sulfonylcarbonyl imides are described in F. Ye et al., *J. Fluorine Chem.*, 81, 2, 1997, pp. 193–196; and L. M. Yagupolskii et al., *Russ. J. Org. Chem.*, 35, 1, 1999, pp. 22–25, and Zh. Org. Khim., 35, 1, 1999, pp. 29–32.

Perfluorinated dicarbonyl imides may be prepared by the reaction of a perfluorinated acid anhydride, $R_fCO(OC)OR_f$, with a perfluorinated carboxamide $R_fCONH_2$, as described in U.S. Pat. No. 2,701,814. Alternative routes to the preparation of these dicarbonyl imides are also described in U.S. Pat. No. 2,701,814 as well as in J.A. Young et al., *J. Amer. Chem. Soc.*, 82, 1960, pp. 4553–4556; dePasquale, *J. Fluorine Chem.*, 8, 1976, pp. 311, 316, 318, 320; S. A. Mazalov et al., *J. Gen. Chem.*, USSR (Engl. Transl.), 36, 1966, pp. 1344–1350.

Emulsifier Cation

The emulsifiers of the present invention comprise a non-interferring cation that is soluble in the aqueous phase when combined with the emulsifier anions of the present invention. Examples of suitable cations include $H^+$, $NH_4^+$, $H_3O^+$, and the alkaline metals and alkaline earth metals, such as $Li^+$, $K^+$, $Na^+$, $Ca^{2+}$, and $Mg^{2+}$. Monovalent cations are preferred.

Based on the art, one skilled in the art would expect that emulsifiers derived from a shorter fluorochemical chain could not be as effective as ones derived from a longer fluorochemical chain. The decrease in the critical micelle concentation (CMC) is roughly one order of magnitude for each —$CH_2CH_2$— added to the chain (*Amphoteric Surfactants*, edited by Eric G. Lomax, Marcel Dekker Inc. (1996), p.13). The same trend has been noted in emulsifiers derived from the perfluorocarboxylic acids and the sulfonic acids (*Organofluorine Chemicals and their Industrial Applications*, edited by R. E. Banks, Ellis Horwood Ltd. (1979), p. 56; J. O. Hendrichs, *Ind. Eng Chem*, 45, 1953, p. 103; M. K. Bernett and W. A. Zisman, *J. Phys. Chem.*, 63, 1959, p. 1912. Because models to explain the actions of emulsifiers often invoke micelle formation and surfactancy, one would expect the same to be true of fluorinated emulsifiers, and that activity of the emulsifier would be closely tied to its chain length and surface energy characteristics.

Expectations from the art were that the shape of the molecule would also impact its ability to act as an emulsifier. Zisman and others have found that with long chain carboxylic acid monolayers on metal plates, the straight chain materials give lower surface energies than the branched analogs. The idealized model of how emulsifiers work in solutions is believed to be represented by the monolayer of polar molecules oriented on a metal surface.

FIG. 1 shows the surface tension (dynes/cm) versus concentration (ppm) profile of ammonium perfluorooctanoate (FLUORAD™ FC-143, available from Minnesota Mining and Manufacturing Company, St. Paul, Minn.) and ammonium bis(perfluorobutanesulfonyl)imide. Surprisingly, as the graph indicates, the CMC (or the point on the graph where the surface energy ceases to change due to the formation of micelles) occurs at similarly low concentrations, suggesting that micelle formation in water occurs at about the same concentration for the two emulsifiers.

In addition, it is particularly advantageous to use perfluorobutanesulfonyl fluoride (PBSF) as an emulsifier precursor as opposed to PFOF because of the higher yield of perfluorobutanesulfonyl fluoride in electrochemical fluorination over perfluoroctanoyl fluoride (*Preparation, Properties, and Industrial Applications of Organofluorine Compounds*, edited by R. E. Banks, Ellis Horwood Ltd (1982), p. 25). Thus, PBSF derived emulsifiers can be produced at a lower cost per unit weight because of their higher yields and still maintain their potency as emulsifiers at the same weight percent.

Suitable emulsifiers of the present invention include, but are not limited to, $NH_4^{+-}N(SO_2C_4F_9)_2$, $NH_4^{+-}N(SO_2C_4F_9)(COC_4F_9)$, $NH_4^{+-}N(COC_4F_9)_2$, $NH_4^{+-}N(SO_2C_2F_5)_2$, $NH_4^{+-}N(SO_2C_4F_9)(COC_3F_7)$, $NH_4^{+-}N(COC_3F_7)_2$, $NH_4^{+-}N(SO_2CF_3)(SO_2C_4F_9)$, $NH_4^{+-}N(COC_5H_{11})(SO_2C_4F_9)$, $Li^{+-}N(SO_2C_4F_9)_2$, $Ca^{2+}[-N(SO_2C_4F_9)(COC_4F_9)]_2$, $Ca^{2+}[-N(COC_4F_9)_2]_2$, and $H_3O^{+-}N(SO_2C_4F_9)_2$ Fluoromonomers Useful fluorinated monomers, or fluoromonomers, include various fluorinated olefinic monomers containing at least one fluorine atom or perfluoroalkyl group attached to at least one of the carbons of the C=C double bond. Suitable monomers include, but are not limited to, hexafluoropropylene (HFP), tetrafluoroethylene (TFE), vinylidene fluoride (VDF), vinyl fluoride, chlorotrifluoroethylene (CTFE), 2-chloropentafluoro-propene, 3,3,3-trifluoropropene, perfluoroalkyl vinyl ethers (e.g., $CF_3OCF=CF_2$, $CF_3CF_2OCF=CF_2$), perfluoroalkoxyalkyl vinyl ethers (e.g., $CF_3O(CF_2)_3OCF=CF_2$) perfluoroalkylallyl ethers (e.g., $CF_3OCF_2CF=CF_2$), 1-hydropentafluoropropene, 2-hydro-pentafluoropropene, dichlorodifluoroethylene, trifluoroethylene, 1,1-dichlorofluoroethylene, and perfluoro-1,3-dioxoles such as those described in U.S. Pat. No. 4,558,142 (Squire).

Non-Fluorinated Monomers

The fluoromonomers can be homopolymerized or can be copolymerized with another fluoromonomer or a non-fluorinated monomer. Useful non-fluorinated monomers include, but are not limited to, ethylene, propylene, vinyl chloride, or vinylidene chloride.

EXAMPLES

The following examples illustrate various specific features, advantages, and other details of the invention. The particular materials and amounts recited in these examples, as well as other conditions and details, should not be construed in a manner that would unduly limit the scope of this invention. All parts, percentages, and ratios are by weight unless otherwise specified.

As used in the examples that follow: "ppm" means parts per million, and the prefix "perfluoro" denotes substitution of all carbon-bonded hydrogen atoms by fluorine atoms.

Ammonium persulfate, ammonium peroxodisulfate, potassium hydrogen phosphate, dimethyl malonate and other chemicals not listed here may be available from general chemical suppliers such as Sigma-Aldrich Chemical of St. Louis, Mo.

"FLUORAD FC143" is a trade designation for ammonium perfluorooctanoate obtained from Minnesota Mining and Manufacturing Company (3M) of St. Paul, Minn.

"HQ115" is a trade designation for lithium bis(trifluoromethanesulfonyl)imide, which is commercially available from 3M.

Perfluorobutanesulfonyl fluoride can be obtained as described in Example 5 of U.S. Pat. No. 5,318,674 (Behr et al.), which patent is incorporated herein by reference.

"SIPONATE DS-10" is a trade designation for sodium dodecylbenzenesulfonate, commercially available from Rhodia, Inc. of Cranberry, N.J.

Tetrafluoroethylene and hexafluoropropylene are commercially available from Daikin Chemical America, Inc. of New York, N.Y.

"TWEEN 80" is a trade designation for polyoxyethylene (20) sorbitan monooleate commercially available from ICI Americas of Wilmington, Del.

Vinylidene fluoride is commercially available from Atofina Chemicals of Philadelphia, Pa.

Test Procedures

Test Procedure I—Surface Tension Determination

All surface tensions were determined using a Kruss K12 Tensiometer. The tensiometer was integrated with an automatic dosimat and a computer, using a software package for dynamic contact angle (K121). The program was run using a Wilhelmy platinum plate (PL12) and glass sample vessel (GL7). All parts referenced above including instrument and computer are available from Kruss USA, Charlotte, N.C.

Test Procedure II—Melt Flow Index

The melt flow index was the amount of the melt in grams per 10 minutes that came through a die using DIN53735, ASTM D-1238. The die had a 2.1 mm diameter and a 8 mm length. The weight was 5 kg and the temperature was 372° C.

Test Procedure III—Mean Particle Size

A Horiba LA-910 (available from Horiba Instruments, In., Irvine, Calif.) static light scattering particle size distribution analyzer was used to obtain mean particle size.

Test Procedure IV—Melting Point

The melting point was measured using a Perkin Elmer (Pyris 1) instrument according to ISO 3146. The instrument was heated at a rate of 10° C./minute.

Test Procedure V—Mean Particle Size (Example 4 only)

A Malvern instrument was used to obtain the mean particle size for Example 4 using the method ISO 13321. This instrument worked in the range of 3 to 3000 nm using a He—Ne laser at a wavelength of 633 nm. The temperature was 20±0.2° C.

Example 1

This example describes the synthesis of $(C_2H_5)_3NH^+$—$N(SO_2C_4F_9)_2$ (triethylammonium bis(perfluorobutanesulfonyl)imide, Intermediate 1).

An oven-dried, 600 mL Parr reactor (Parr Instrument Co., Moline, Ill.) constructed of HASTALLOY™ and MONEL™ and equipped with a MAGNETRON™ stirrer, Parr 4843 controller, a needle valve for gaseous ammonia addition, a dip tube for liquid product removal, 600 psi (4.1 MPas) pressure gauge, thermocouple probe and a heating mantle was vacuum charged with 187.2 grams anhydrous triethylamine and 362.5 grams high purity perfluorobutanesulfonyl fluoride. The reactor body was then chilled in a dry ice bath to approximately −20° C. Once cool, the reactor was charged with 9.0 grams anhydrous ammonia gas, which was introduce through a needle valve attached to the reactor head assembly to allow precise gas metering from the gas cylinder mounted on an adjacent balance. Once all the ammonia was added, the reactor was mounted in its stand with a heating mantle, stirring was begun at full speed (700 RPM) and the reactor temperature was rapidly ramped up to 90° C. A maximum pressure of 100 psi (0.7 MPas) was reached at approximately 20° C. during the temperature ramp. Increasing the reactor temperature beyond 40° C. resulted in a rapid drop in pressure as ammonia was rapidly consumed. Once the set-point temperature of 90° C. was reached, the temperature was held at this value for 19 hours (overnight). At the end of the heating cycle, residual perfluorobutanesulfonyl fluoride and triethylamine were removed by vacuum stripping for approximately one hour at 90° C., 40 Torr through the gas port in the reactor head while stirring. Volatiles were collected in a dry ice trap. The reactor was then allowed to cool to near room temperature and the crude product was collected in a polyethylene bottle by pressurizing the reactor with about 10 psi (0.07 MPas) nitrogen and forcing the liquid contents out the dip tube. Without disassembling or cleaning the reactor, this exact procedure was repeated a second time to generate a second batch of crude product. The combined crude product collected from batches 1 and 2 totaled 976.9 grams. Although liquid initially, the crude product partially solidified upon standing overnight at room temperature.

A total of 975 grams of the isolated material was melted in the oven at 50° C. and was washed in a flask with 1800 grams of water at 44° C. The top water phase was removed using a TEFLON™ tube at the end of a black rubber hose attached to an aspirator, and the bottom dark brown fluorochemical phase was washed again with 1800 ml water at 57° C., then allowed to cool to 17° C. at which point the stirring was stopped and the material solidified. The top water layer was then removed using a TEFLON™ tube at the end of a black rubber hose attached to an aspirator. The brown fluorochemical phase was washed with water three more times as before. A total of 744 grams of Intermediate 1 was poured out of the flask at 77° C.

Example 2

This example describes the synthesis of bis(perfluorobutanesulfonyl)imide (i.e., $HN(SO_2C_4F_9)_2$).

Intermediate 1 was placed back in a flask and the material was heated at 10 mm Hg (1.3 kPa) vacuum at 77° C. for one hour to remove the dissolved water (49 grams). At this time, the vacuum was broken, and 419 grams of 94–96% sulfuric acid was added to the dried Intermediate 1 with stirring. The temperature increased to 93° C. The imide acid was distilled from the sulfuric acid at 4 mm to give 551 grams of $HN(SO_2C_4F_9)_2$ that distilled at 110–125° C. Water analysis revealed the material to be 4 weight percent water.

Example 3

Synthesis of ammonium bis(perfluorobutanesulfonyl)imide (i.e., $NH_4^+{}^-N(SO_2C_4F_9)_2$).

A total of 174 grams $HN(SO_2C_4F_9)_2$ from Example 2 was dissolved in 1540 grams of water. The pH of the solution was in the range of 0 to 1. A total of 17 grams of 30% ammonium hydroxide was added with stirring. The pH remained in the range of 0 to 1. Another 6.7 grams of 30% ammonium hydroxide was added. The pH was found to be 7 to 8. The batch was heated to 40° C. and nitrogen was purged through the solution for 2 hours. At that time, the flask was cooled to room temperature and poured into a plastic bottle. A total of 1738 grams of ammonium bis(perfluorobutanesulfonyl)imide solution was isolated and found to be 9.8 weight percent solids. Table 1 shows the surface energy of ammonium bis(perfluorobutanesulfonyl)imide and ammonium perfluorooctanoate (obtained as FLUORAD™ FC-143) at various concentrations in water.

TABLE 1

| Ammonium Perfluorooctanoate (FLUORAD ™ FC-143) | | Ammonium Bis(perfluorobutanesulfonyl)imide | |
|---|---|---|---|
| Concentration in water (ppm) | Surface Tension (mN/m) | Concentration in water (ppm) | Surface Tension (mN/m) |
| 255.2 | 65.39 | 224.9 | 48.63 |
| 450.1 | 61.75 | 450.0 | 44.12 |
| 751.2 | 57.23 | 999.7 | 40.12 |
| 1210 | 52.23 | 1254 | 38.67 |
| 1894 | 47.27 | 1675 | 35.90 |
| 2881 | 41.09 | 2733 | 31.56 |
| 4243 | 35.18 | 4100 | 27.57 |
| 6007 | 29.67 | 6000 | 25.54 |
| 8116 | 24.78 | 7796 | 22.50 |
| 10400 | 21.00 | 9979 | 20.62 |
| 20000 | 20.18 | 19990 | 18.46 |

Example 4

This example describes the emulsion co-polymerization of tetrafluoroethylene and hexafluoropropylene using ammonium bis(perfluorobutanesulfonyl)imide as an emulsifier.

Demineralized water (29 L), was placed in a polymerization reactor having a total volume of 47 L and equipped with an impeller stirrer. Once the reactor had been sealed, oxygen levels were reduced by repeated flushing with nitrogen by application of reduced pressure followed by back filling with nitrogen. The reactor was heated to 70° C. The contents of the reactor were placed under reduced pressure (0.3 bar) and sealed. Then 800 grams of a 30 weight percent solution of ammonium bis(perfluorobutanesulfonyl)imide (containing 240 grams ammonium bis(perfluorobutanesulfonyl)imide) was metered into the reactor over 5 minutes. Tetrafluoroethylene and hexafluoropropylene (in a 7:10 weight ratio, respectively) were then introduced over 1.5 hr until the total pressure reached 17.0 bar.

Polymerization was initiated by addition of a solution of 24 grams ammonium peroxodisulfate dissolved in 100 mL demineralized water. As soon as the pressure began to fall, additional hexafluoropropylene and tetrafluoroethylene and were added in a weight ratio of 0.11 such that a constant pressure of 17.0 bar was maintained. The temperature was maintained at 70° C. during the process by cooling the reactor wall. After 204 minutes, the introduction of monomers was stopped, the pressure in the reactor reduced, and the reactor flushed several times with nitrogen. The resultant polymer dispersion was 3.9 weight percent solids and had a mean particle size of 149 nm. The resultant copolymer had a hexafluoropropylene content of 12.4 weight percent, a melting point of 270° C., and a melt flow index (372/5) of 222.

Example 5

This example describes the emulsion co-polymerization of vinylidene fluoride and hexafluoropropylene using lithium bis(perfluoroethanesulfonyl)imide as an emulsifier.

Potassium monophosphate dibasic (0.15 grams), 0.15 grams ammonium persulfate, 0.5 grams lithium bis(perfluoroethanesulfonyl)imide, and 0.1 grams dimethyl malonate dissolved in 150 grams water were vacuum charged into a 500 mL autoclave. Hexafluoropropylene (19.5 grams) and 30.5 grams vinylidene fluoride were pressurized into the autoclave and heated, with stirring, to 71° C. for 16 hours. After cooling to room temperature, 166.8 grams of a milk-like liquid (15.1 weight percent solids) having a mean particle size of 179 nm was obtained. No coagulum was observed.

Example 6

This example describes the emulsion co-polymerization of vinylidene fluoride and hexafluoropropylene using ammonium bis(perfluorobutanesulfonyl)imide as an emulsifier.

Potassium monophosphate dibasic (0.5 grams), 0.5 grams ammonium persulfate, 0.5 grams ammonium bis(perfluorobutanesulfonyl)imide, and 0.1 grams dimethyl malonate dissolved in 150 g water were vacuum charged into a 500 mL autoclave. Hexafluoropropylene (19.5 grams) and 30.5 grams vinylidene fluoride were pressurized into the autoclave and heated, with stirring, to 71° C. for 16 hours. After cooling to room temperature, 166.8 grams of a latex (12.4 weight percent solids) having a mean particle size of 179 nm and no apparent sediment was obtained.

Example 7 (Comparative)

This example describes the emulsion co-polymerization of vinylidene fluoride and hexafluoropropylene using HQ115™ as an emulsifier.

Potassium hydrogen phosphate (0.5 grams), 0.5 grams ammonium persulfate, 0.5 grams HQ115™ and 0.1 g dimethyl malonate dissolved in 150 grams of water were vacuum charged into a baffled 500 mL reactor. The reactor was then twice pressurized with nitrogen to 400 psi (2.8 MPa) and evacuated to remove oxygen. Subsequently, 19.5 grams hexafluoropropylene and 30.5 grams vinylidene fluoride were independently batch charged into the high pressure reactor and heated with stirring, to 71° C. for 16 hours. The reaction yielded 146.3 grams of a 12.7 weight percent solids slurry with a mean particle size of 45.4 microns. The resultant aqueous dispersion settled very quickly due to its large particle size, much as when polymerization is carried out in the absence of an emulsifier.

Example 8 (Comparative)

This example describes the emulsion co-polymerization of vinylidene fluoride and hexafluoropropylene using ammonium perfluorooctanoate (obtained as FLUORAD™ FC 143) as an emulsifier.

Potassium monophosphate dibasic (0.5 grams), 0.5 grams ammonium persulfate, 0.5 grams FLUORAD™ FC143 and 0.1 grams dimethyl malonate dissolved in 150 grams water were vacuum charged into a 500 mL autoclave. Thereafter, 19.5 grams hexafluoropropylene and 30.5 grams vinylidene fluoride were pressurized into the autoclave and heated, with stirring, to 71° C. for 16 hours. After cooling to room temperature, 167.9 grams of a latex (13.4 weight percent solids) was obtained having a mean particle size of 214 nm.

Example 9 (Comparative)

This example describes the emulsion co-polymerization of vinylidene fluoride and hexafluoropropylene without an emulsifier.

Potassium monophosphate dibasic (0.5 grams), 0.5 grams ammonium persulfate and 0.1 grams dimethyl malonate dissolved in 150 grams water were vacuum charged into a 500 mL autoclave. Hexafluoropropylene (19.5 grams) and 30.5 grams vinylidene fluoride were pressurized into the autoclave and heated, with stirring, to 71° C. for 16 hours. After cooling to room temperature, a white slurry (13.0 weight percent solids) was obtained having a mean particle size of 50 microns was obtained that settled out to form a sediment within minutes.

Attempts to carry out emulsion polymerization as described in Example 9 using TWEEN 80 and SIPONATE DS-10 as emulsifiers in place of lithium bis(perfluorodibutyl)imide did not yield significant amounts of latex.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for preparing fluoropolymers comprising emulsion polymerizing in an aqueous phase, under free-radical conditions, at least one fluoromonomer in the presence of at least one emulsifier and at least one initiator, wherein said emulsifier comprises:

(a) at least one anion of the following formula:

where each Q is independently CO or $SO_2$ and each $R_f$ is independently a perfluorinated alkyl group; and (b) a non-interfering cation.

2. The method for preparing fluoropolymers according to claim 1, wherein said fluoromonomer is a fluorinated olefinic monomer comprising at least one fluorine atom or perfluoroalkyl group attached to at least one carbon of the C=C double bond.

3. The method for preparing fluoropolymers according to claim 2, wherein said fluoromonomer is hexafluoropropylene, tetrafluoroethylene, vinylidene fluoride, or a mixture thereof.

4. The method for preparing fluoropolymers according to claim 3, wherein said fluoromonomer further comprises a perfluoroalkyl vinyl ether, a perfluoroalkoxyalkyl vinyl ether, a perfluoroalkylallyl ether, a perfluoro-1,3-dioxole, or a mixture thereof.

5. The method for preparing fluoropolymers according to claim 3, wherein said fluoromonomer further comprises vinyl fluoride, chlorotrifluoroethylene, 2-chloropentafluoropropene, 3,3,3-trifluoropropene, $CF_3OCF=CF_2$, $CF_3CF_2OCF=CF_2$, $CF_3O(CF_2)_3OCF=CF_2$, $CF_3OCF_2CF=CF_2$, 1-hydropentafluoropropene, 2-hydropentafluoropropene, dichlorodifluoroethylene, trifluoroethylene, 1,1-dichlorofluoroethylene, or a mixture thereof.

6. The method for preparing fluoropolymers according to claim 1, wherein any two $R_f$ groups are linked to form a ring.

7. The method for preparing fluoropolymers according to claim 1, wherein said perfluorinated alkyl group comprises catenated heteroatoms selected from the group consisting of O and N.

8. The method for preparing fluoropolymers according to claim 1, wherein each $R_f$ group has at least 2 carbon atoms.

9. The method for preparing fluoropolymers according to claim 1, wherein each $R_f$ group has from 3 to 6 carbon atoms.

10. The method for preparing fluoropolymers according to claim 1 wherein each Q is a sulfonyl group.

11. The method for preparing fluoropolymers according to claim 1, wherein said anion is a carbonyl sulfonyl imide.

12. The method for preparing fluoropolymers according to claim 1, wherein said anion is a dicarbonyl imide.

13. The method for preparing fluoropolymers according to claim 1, wherein said anion is bis(perfluorobutanesulfonyl)imide.

14. The method for preparing fluoropolymers according to claim 1, wherein said anion is selected from the group consisting of:

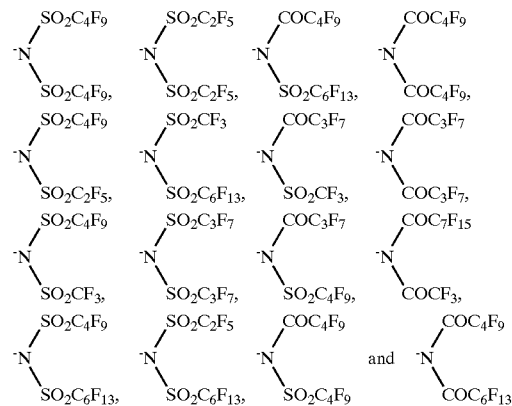

and mixtures thereof.

15. The method for preparing fluoropolymers according to claim 1, wherein said cation is $H^+$, $NH_4^+$, $H_3O^+$, $Li^+$, $K^+$, $Na^+$, $Ca^{2+}$, or $Mg^{2+}$.

16. The method for preparing fluoropolymers according to claim 1 wherein said emulsifier is $NH_4^{+-}N(SO_2C_4F_9)_2$, $NH_4^{+-}N(SO_2C_4F_9)(COC_4F_9)$, $NH_4^{+-}N(COC_4F_9)_2$, $NH_4^{+-}N(SO_2C_2F_5)_2$, $NH_4^{+-}N(SO_2C_4F_9)(COC_3F_7)$, $NH_4^{+-}N(COC_3F_7)_2$, $NH_4^{+-}N(SO_2CF_3)(SO_2C_4F_9)$, $NH_4^{+-}N(COC_5H_{11})(SO_2C_4F_9)$, $Li^{+-}N(SO_2C_4F_9)_2$, $Ca^{2+}[^-N(SO_2C_4F_9)(COC_4F_9)]_2$, $Ca^{2+}[^-N(COC_4F_9)_2]_2$, $H_3O^{+-}N(SO_2C_4F_9)_2$, or a mixture thereof.

17. The method for preparing fluoropolymers according to claim 1, wherein said aqueous phase further comprises at least one chain transfer agent.

18. The method for preparing fluoropolymers according to claim 1, wherein said aqueous phase further comprises at least one non-fluorinated monomer.

19. The method for preparing fluoropolymers according to claim 18, wherein said non-fluorinated monomer is ethylene, propylene, vinyl chloride, vinylidene chloride or a mixture thereof.

* * * * *